United States Patent
Cohen et al.

(10) Patent No.: US 9,336,245 B2
(45) Date of Patent: May 10, 2016

(54) SYSTEMS AND METHODS PROVIDING MASTER DATA MANAGEMENT STATISTICS

(71) Applicants: Ronen Cohen, Gesher Haziv (IL); Nimrod Vishnia-Shabtai, Kfar Havradim (IL)

(72) Inventors: Ronen Cohen, Gesher Haziv (IL); Nimrod Vishnia-Shabtai, Kfar Havradim (IL)

(73) Assignee: SAP SE, Walldorf (DE)

( * ) Notice: Subject to any disclaimer, the term of this patent is extended or adjusted under 35 U.S.C. 154(b) by 372 days.

(21) Appl. No.: 14/140,038

(22) Filed: Dec. 24, 2013

(65) Prior Publication Data

US 2015/0178327 A1     Jun. 25, 2015

(51) Int. Cl.
*G06F 7/00* (2006.01)
*G06F 17/30* (2006.01)

(52) U.S. Cl.
CPC ...... *G06F 17/30289* (2013.01); *G06F 17/3056* (2013.01)

(58) Field of Classification Search
None
See application file for complete search history.

(56) References Cited

U.S. PATENT DOCUMENTS

| | | | |
|---|---|---|---|
| 7,769,726 B2 | 8/2010 | Gitai et al. | |
| 7,774,378 B2 * | 8/2010 | Nelson | G06F 17/30867 707/803 |
| 8,239,423 B2 | 8/2012 | Gitai et al. | |
| 8,341,131 B2 | 12/2012 | Cohen | |
| 8,463,755 B2 | 6/2013 | Kretschmer | |
| 8,482,566 B2 | 7/2013 | Ito | |
| 8,515,987 B1 * | 8/2013 | Jain | G06F 17/30303 707/769 |
| 2004/0220955 A1 * | 11/2004 | McKee | G06Q 30/02 |
| 2008/0209451 A1 | 8/2008 | Michels et al. | |
| 2008/0288965 A1 | 11/2008 | Grechanik et al. | |
| 2009/0099852 A1 | 4/2009 | Ouimet | |
| 2010/0169488 A1 | 7/2010 | Ram et al. | |
| 2011/0231361 A1 | 9/2011 | Patchava et al. | |
| 2012/0246110 A1 | 9/2012 | Fischer | |
| 2012/0303673 A1 * | 11/2012 | Anand | G06F 17/3075 707/802 |
| 2013/0046781 A1 | 2/2013 | Frankel et al. | |
| 2013/0060818 A1 * | 3/2013 | Lambeth | H04L 12/4633 707/803 |
| 2013/0268494 A1 | 10/2013 | Tahiliani et al. | |
| 2015/0142726 A1 * | 5/2015 | Taylor | G06F 17/30592 707/603 |

FOREIGN PATENT DOCUMENTS

WO     WO-2013185175 A1     12/2013

* cited by examiner

*Primary Examiner* — Uyen Le
(74) *Attorney, Agent, or Firm* — Buckley, Maschoff & Talwalkar LLC

(57) ABSTRACT

According to some embodiments, a plurality of records may be received over a period of time from a plurality of sources. As the records are received during the period of time, master data management may be performed to match at least some records from different sources with each other. A statistics window within the period of time may be determined, and at least one master data management statistics value may be calculated based on the master data management that was performed during the statistics window. The calculated master data management statistics value may then be displayed.

21 Claims, 12 Drawing Sheets

SYSTEMS AND METHODS PROVIDING MASTER DATA MANAGEMENT STATISTICS

FIELD

Some embodiments relate to master data management. More specifically, some embodiments provide systems and methods for providing mast data management statistics.

BACKGROUND

A business or enterprise may store information about various items in the form of electronic records. For example, a company might have an employee database where each row in the database represents a record containing information about a particular employee (e.g., the employee's name, date of hire, and salary). Moreover, different electronic records may actually be related to a single item. For example, a human resources database and a sales representative database might both contain records about the same employee. In some cases, it may be desirable to consolidate multiple records to create a single data store that contains a single electronic record for each item represented in the database. Such a goal might be associated with, for example, an automated master data management application and/or a data steward that attempt to automatically recognize or match these records to create a correct "master" data store. Advantages associated with creating such a master data store might include increased efficiency through the enterprise and/or improved customer service. For example, when a sales representative retrieves a customer record, the master data store might include contact information that would have been missing if information from multiple sources were not correctly matched and merged.

The consolidation process in a master data management program can be a relatively time consuming and/or expensive task, especially when a substantial number of records (e.g., millions of records) and/or input data sources are involved. It can be difficult, however, to determine the advantages created by the master data management program. For example, an enterprise might be unsure if it should devote the employee hours and/or costs associated with a master data management program without understanding the benefits it will provide.

Accordingly, methods and mechanisms for accurately and efficiently demonstrating the results of a master data management program may be desired.

DETAILED DESCRIPTION

Figure 1:
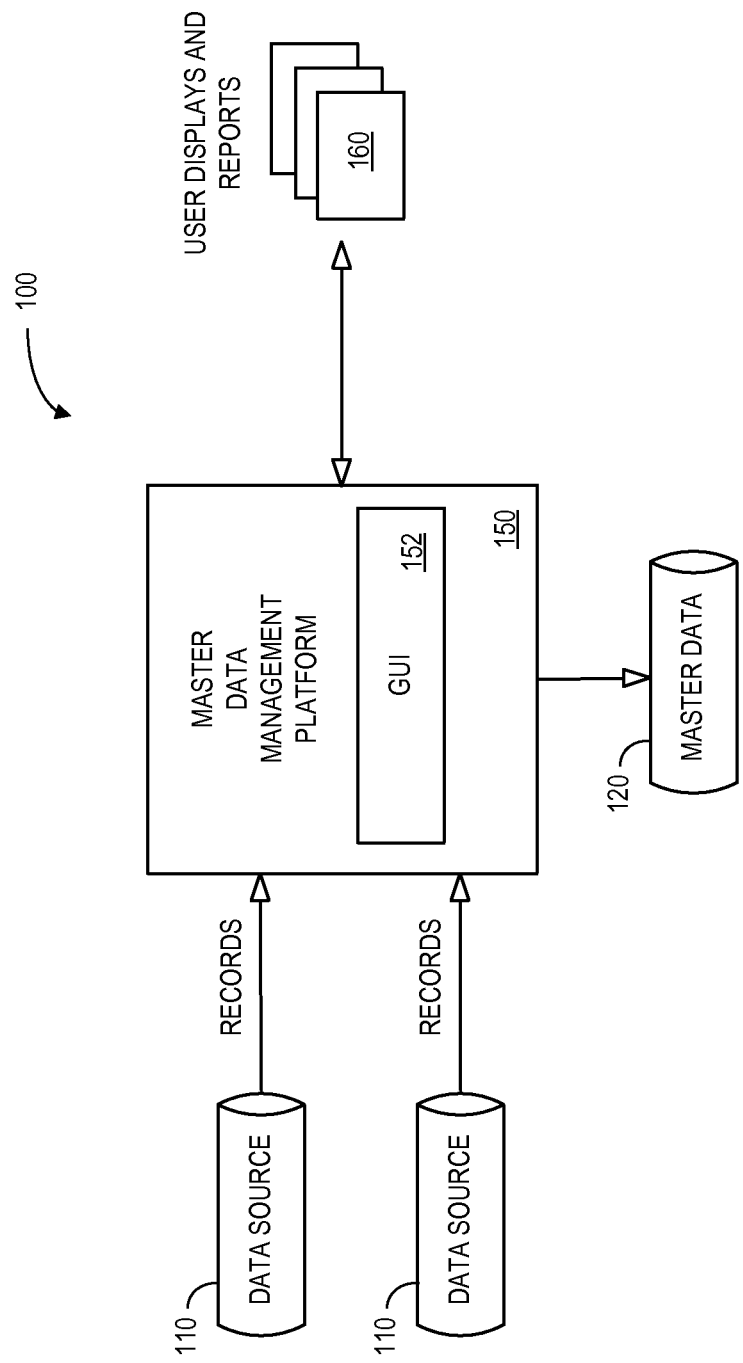
FIG. 1 is a block diagram of a system that might be associated with master data management according to some embodiments.

FIG. 1 is a block diagram of a system 100 that might be associated with master data management. The system 100 includes a number of data stores 110 storing records. Note that each record might contain a number of fields (e.g., a key number, business partner name, license number, and/or postal address). Different data stores 110 may, for example, be associated with different business applications, including legacy applications. According to some embodiments, one or more data stores 110 might be associated with an Enterprise Resource Planning ("ERP") system. Note that the records might be stored within physical tables of a database. The database might comprise a relational database such as SAP MaxDB, Oracle, Microsoft SQL Server, IBM DB2, Teradata and the like. As another example, the data stores 110 might be associated with a multi-dimensional database, an eXtendable Markup Language ("XML") document, or any other structured data storage system. The physical tables may be distributed among several relational databases, dimensional databases, and/or other data sources.

A master data management platform 150 may receive input records from the various data stores 110. For example, the master data management platform 150 might import the input records from a remote data store 110 via HyperText Transport Protocol ("HTTP") communication or any other type of data exchange. The master data management platform 150 and/or data stores 110 might be associated with, for example, Personal Computers ("PCs"), servers, and/or mobile devices.

The master data management platform 150 may consolidate and/or merge the input records received from the data stores 110 and store master records into a master data store 130 in accordance with any of the embodiments described herein. For example, a human resources database and a sales representative database might both contain records about the same employee. In this case, the master data management platform 150 might automatically consolidate the multiple records to create a single master record for that employee (and the master record might include information from both systems). Such a goal might be associated with, for example, a master data management program.

According to some embodiments, a consolidation of records in master data management is associated with a two phase process of (i) identifying potential duplicates and then (ii) merging the records into a single best representative instance of the record. Note that large sets of data might be extracted from multiple legacy systems into the master data management platform 150 and include some obvious, straight forward duplicates that need to (and can be) resolved and merged immediately after the data is imported into the master data management platform 150. In many cases, the duplicate detection will be straight forward, such as when it is based on a well defined identifier that can't be interpreted in ambiguous ways. Examples of such identifiers include a Social Security Number for to identify individuals or a Global Trade Item Number ("GTIN") to detect duplicate materials.

In some cases, however, duplicate records may need to be merged into a single physical record, but conflicting data values exist among the different records. For example, one record might indicate a home address of "123 Main Street" while another record indicates a home address of "12 Main Street." A rule based mechanism may facilitate consolidation in any conflict situation, and this logic may comprise a set of rules that automate and streamline the consolidation process in master data management. After the records are merged, an administrator or data steward may interact with a Graphical User Interface 152 to create displays and/or reports in accordance with any of the embodiments described herein.

Note that FIG. 1 represents a logical architecture according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip® disk, magnetic tape, and solid state Random Access Memory (RAM) or Read Only Memory (ROM) storage units. Embodiments are therefore not limited to any specific combination of hardware and software.

Figure 2:
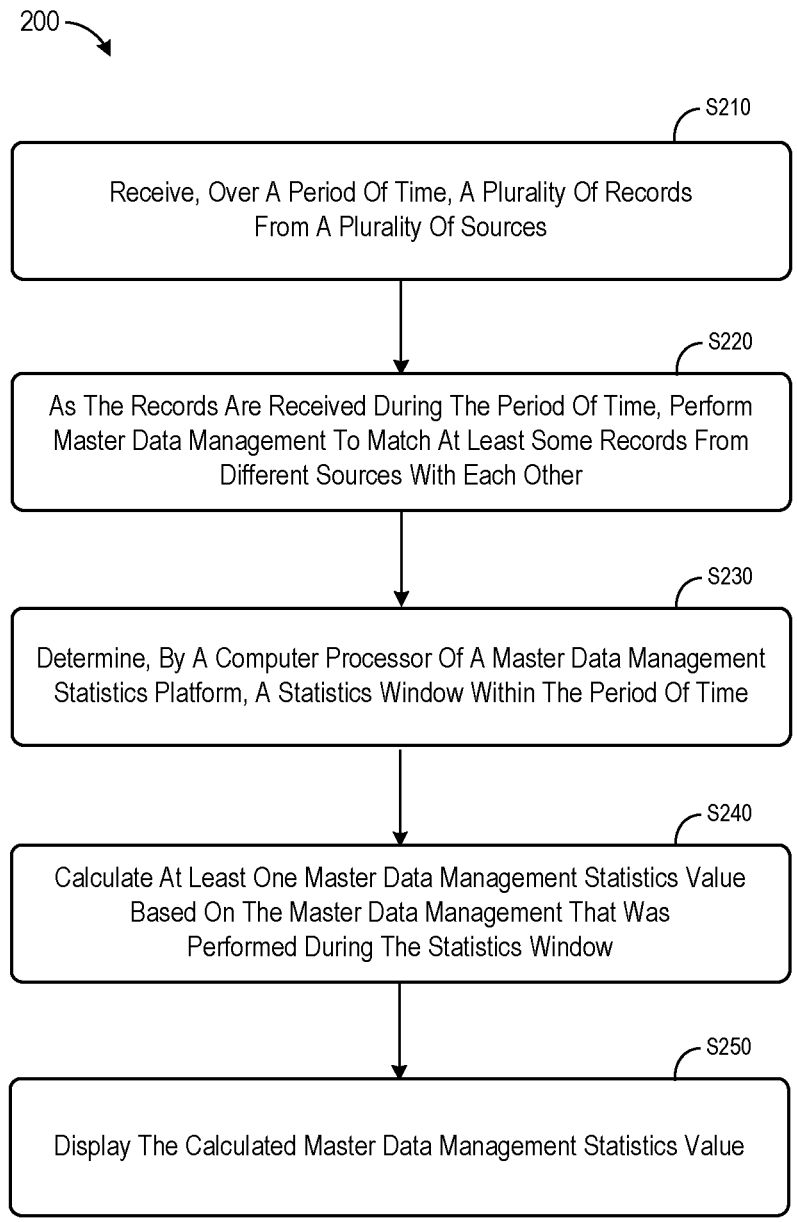
FIG. 2 is a flow diagram of a process in accordance with some embodiments.

The master data management platform 150 may operate in accordance with any of the embodiments described herein. For example, FIG. 2 is a flow diagram of a process 200 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S210, a plurality of input records may be received over a period of time from a plurality of sources. For example, batches of record might be received from enterprise resource planning system and a customer relationship management system on a periodic basis.

At S220, master data management may be performed as the records are received (i.e., during the period of time) to match at least some records from different sources with each other. For example, fields within each record might be used to determine that two slightly different records actually refer to the same "real word" object (e.g., purchase order).

At S230, a statistics "window" within the period of time may be determined. For example, the statistics window may be associated with a statistics start date and a statistics end date. According to some embodiments, the statistics start date and the statistics end date are defined by a data steward. Other examples of a statistics window might include "from Jan. 1, 2010 to the present" and "over the last four months."

At S240, at least one master data management statistics value may be calculated based on the master data management that was performed during the statistics window. Note that the calculated master data management statistics value might not be based on master data management that was performed before a statistics start date or after a statistics end date.

According to some embodiments, the calculated master data management statistics value is associated with records "consumed" by another application. Such a value might help, for example, demonstrate to a budget planner how useful a master data management program is to an enterprise (e.g., because the records improved by the program are frequently being used by other applications within the enterprise). As other examples, the calculated master data management statistics value might be associated with source based record distribution, region based record distribution, record cleansing data, record matching data, record duplication data, best record calculations, and/or a record refinement rate.

At S250, the calculated master data management statistics value may be displayed. According to some embodiments, the calculated master data management statistics value is displayed to a data steward both as a numerical value and as a graphical representation.

Figure 3:
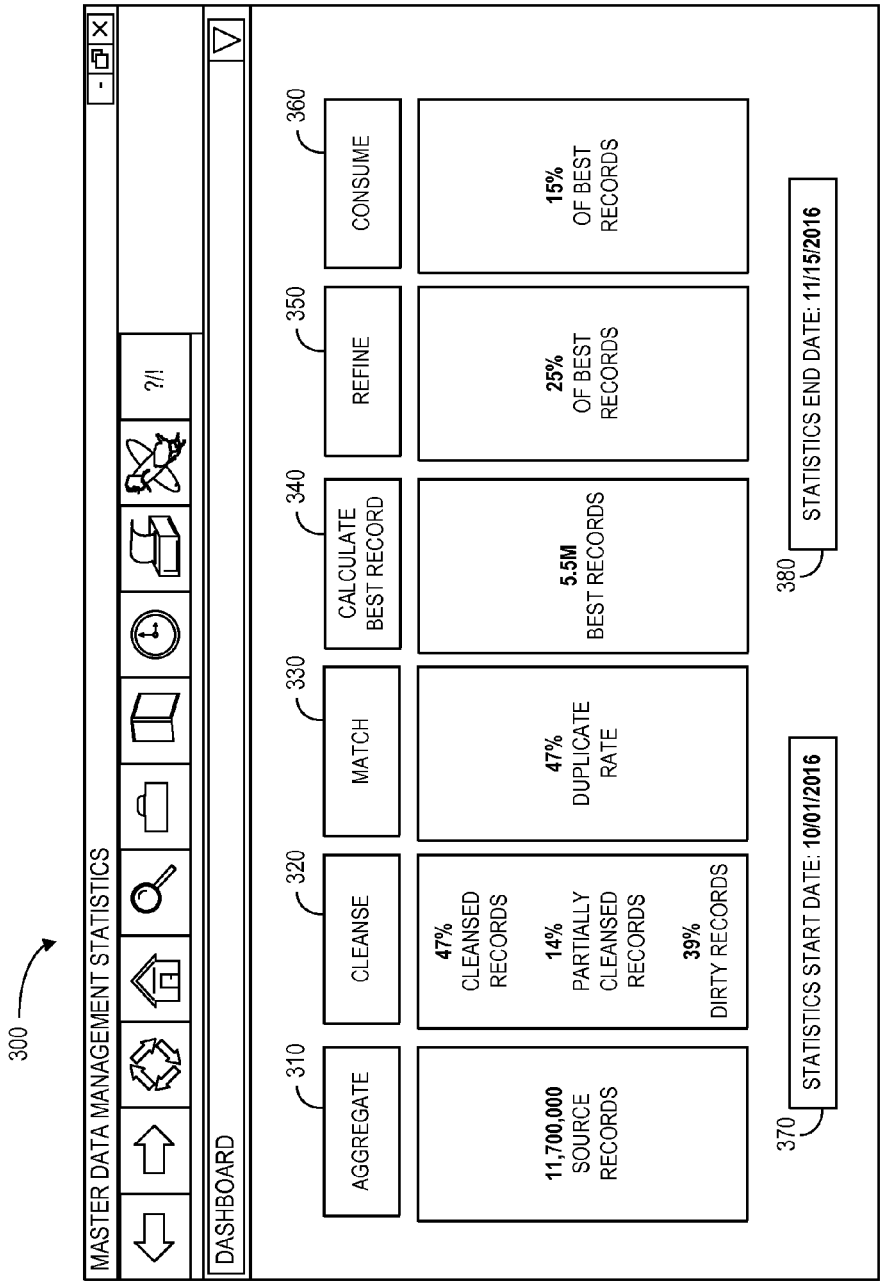
FIG. 3 illustrates a dashboard display that may be provided according to some embodiments.

FIG. 3 illustrates a dashboard display 300 that may be provided according to some embodiments. The dashboard display 300 includes an aggregate information area 310 (e.g., associated with a total number of source records) that may be selected by a data steward to view a source record distribution display such as the example described with respect to FIG. 4). The dashboard display 300 may also include a cleanse information area 310 (e.g., associated with cleansed, partially cleansed, and dirty records) that may be selected by a data steward to view a cleansed record distribution display such as the example described with respect to FIG. 5. The dashboard display 300 may also include a match information area 310 (e.g., associated with a duplication rate) that may be selected by a data steward to view a matching display such as the example described with respect to FIG. 6. The dashboard display 300 may also include calculate best record and refine information areas 340, 350 that may be selected by a data steward to view an additional information display such as the example described with respect to FIG. 7. The dashboard display 300 may further include a consume information area 310 (e.g., associated with how many best records are being retrieved by other applications) that may be selected by a data steward to view a consumption display such as the example described with respect to FIG. 8. Finally, the dashboard display 300 may indicate a statistics start date 370 and a statistics end date 380 (and a data steward may define or adjust those dates as desired).

Figure 4:
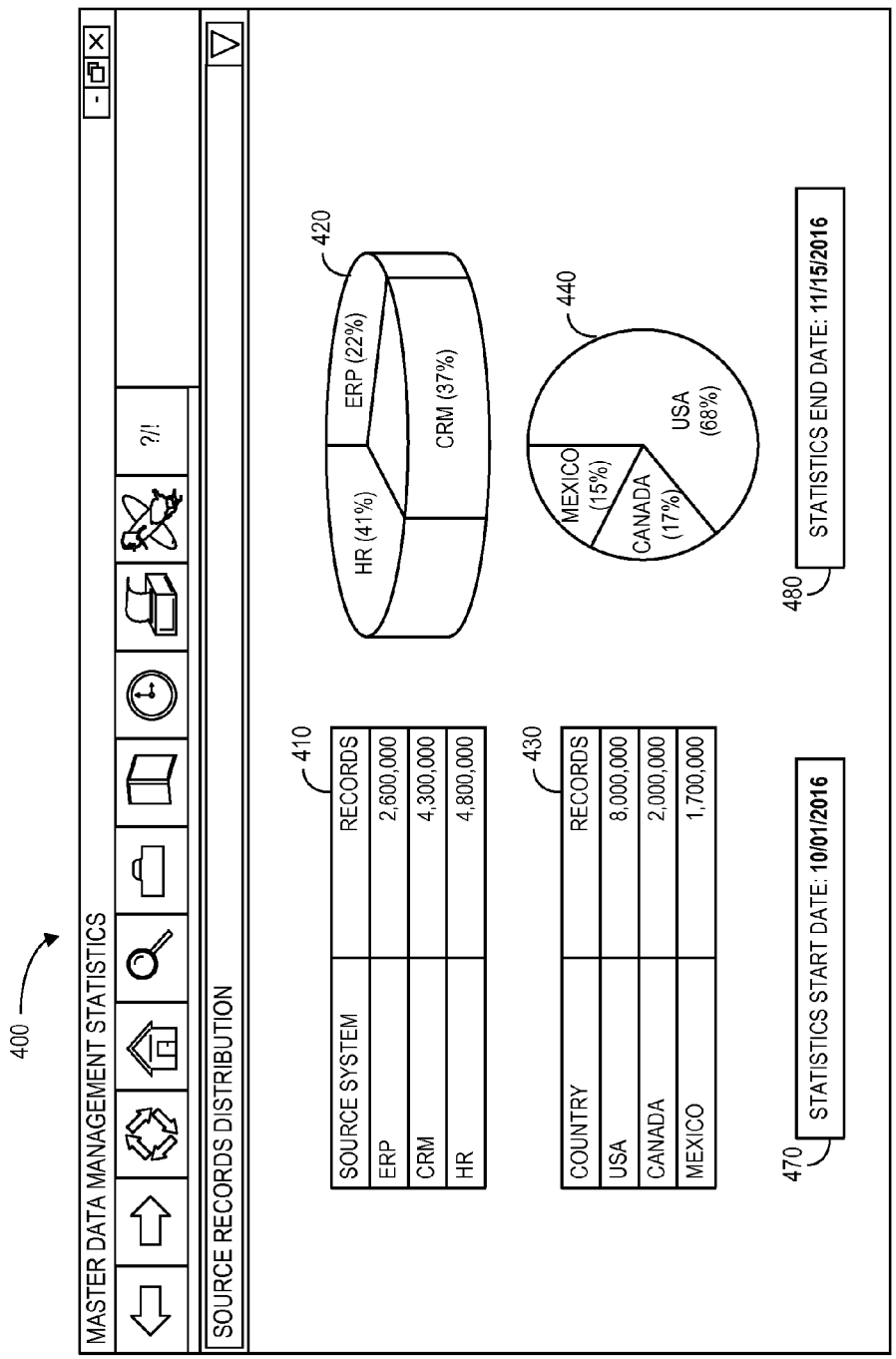
FIG. 4 illustrates a source records distribution display that may be provided according to some embodiments.

FIG. 4 illustrates a source records distribution display 400 that may be provided according to some embodiments. In particular, the source records distribution display 400 includes a source table 410 and associated graphical source indication 420 indicating how many records came from various source systems. In the example of FIG. 4, a Human Resources ("HR") source system provided 4,800,000 electronic records, representing 41% of the overall number of records received. Similarly, the source records distribution display 400 includes a country table 430 and associated graphical country indication 440 indicating how many records came from various geographic regions. In the example of FIG. 4, a Canada provided 2,000,000 electronic records, representing 17% of the overall number of records received. According to some embodiments, a Google map based graphical country indication 440 may be provided. The display 400 may further indicate a statistics start date 370 and a statistics end date 380 (and a data steward may define or adjust those dates as desired). That is, the USA provided 8,000,000 records between Oct. 1, 2016 and Nov. 15, 2016

(and if either the statistics start or end date 470, 480 is changed, that number of records would be re-calculated as appropriate). In this way, a data steward may help others understand the scope of information being processed by a master data management program over various periods of time (e.g., to justify a submitted master data management budget).

Figure 5:
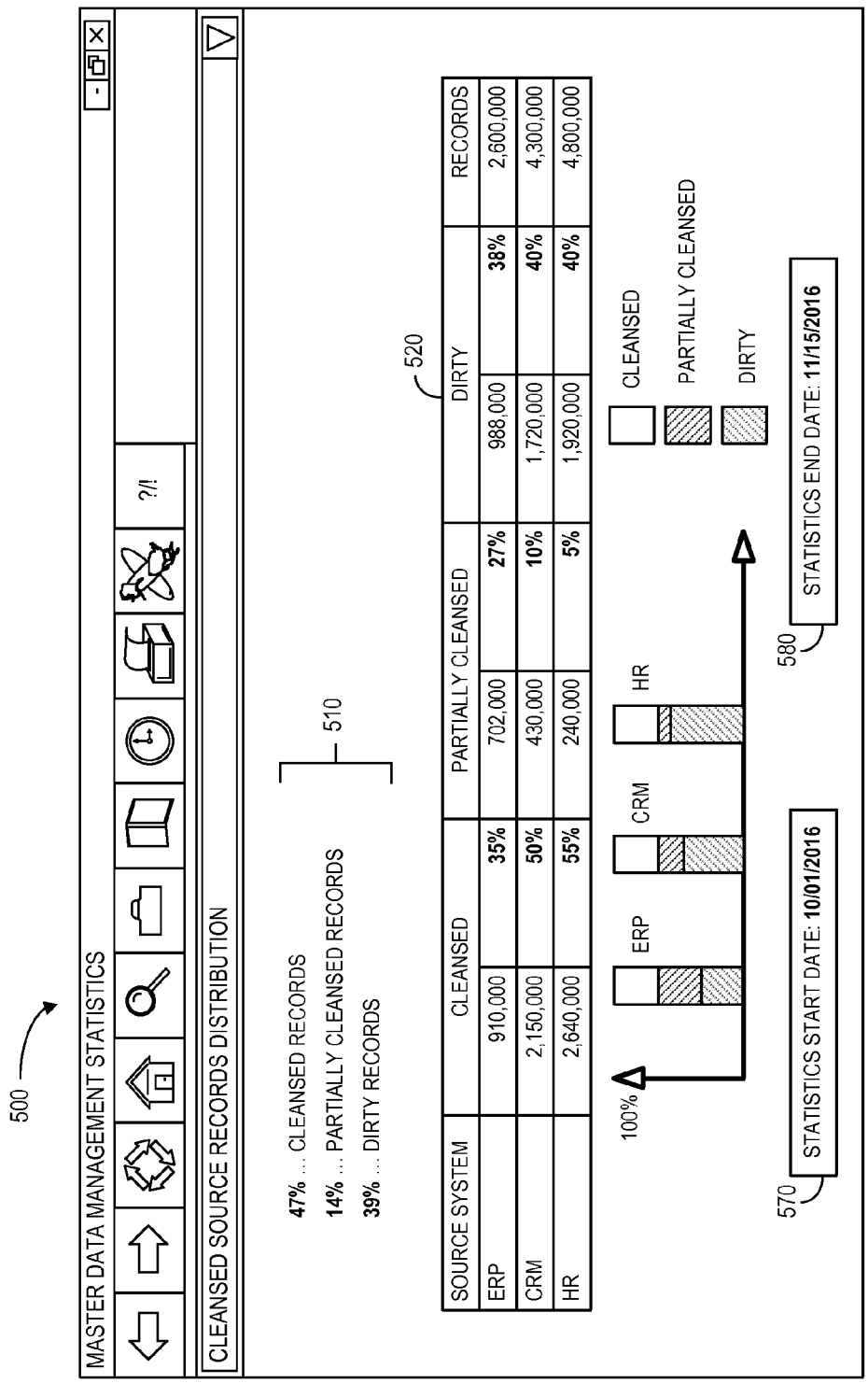
FIG. 5 illustrates a cleansed record distribution display that may be provided in accordance with some embodiments.

FIG. 5 illustrates a cleansed record distribution display 500 that may be provided in accordance with some embodiments. In particular, the cleansed record display 500 may provide information 510 about how many records have been cleansed (e.g., an address has been completely validated via a well-defined postal directory), partially cleansed (e.g., a portion of an address could not be completed for some reason), and/or still remain "dirty" (un-cleansed and could not be matched with another record at all). The cleansed record display 500 may further include a table breaking down this information based on which systems from which the records originated. The display 500 may further indicate a statistics start date 570 and a statistics end date 580 (and a data steward may define or adjust those dates as desired). That is, the 5% of the records from an HR system became partially cleansed between Oct. 1, 2016 and Nov. 15, 2016 (and if either the statistics start or end date 570, 580 is changed, that percentage would be re-calculated as appropriate). In this way, a data steward may help others understand the scope of information being cleansed by a master data management program over various periods of time (and perhaps give management an understanding of areas that need further attention).

Figure 6:
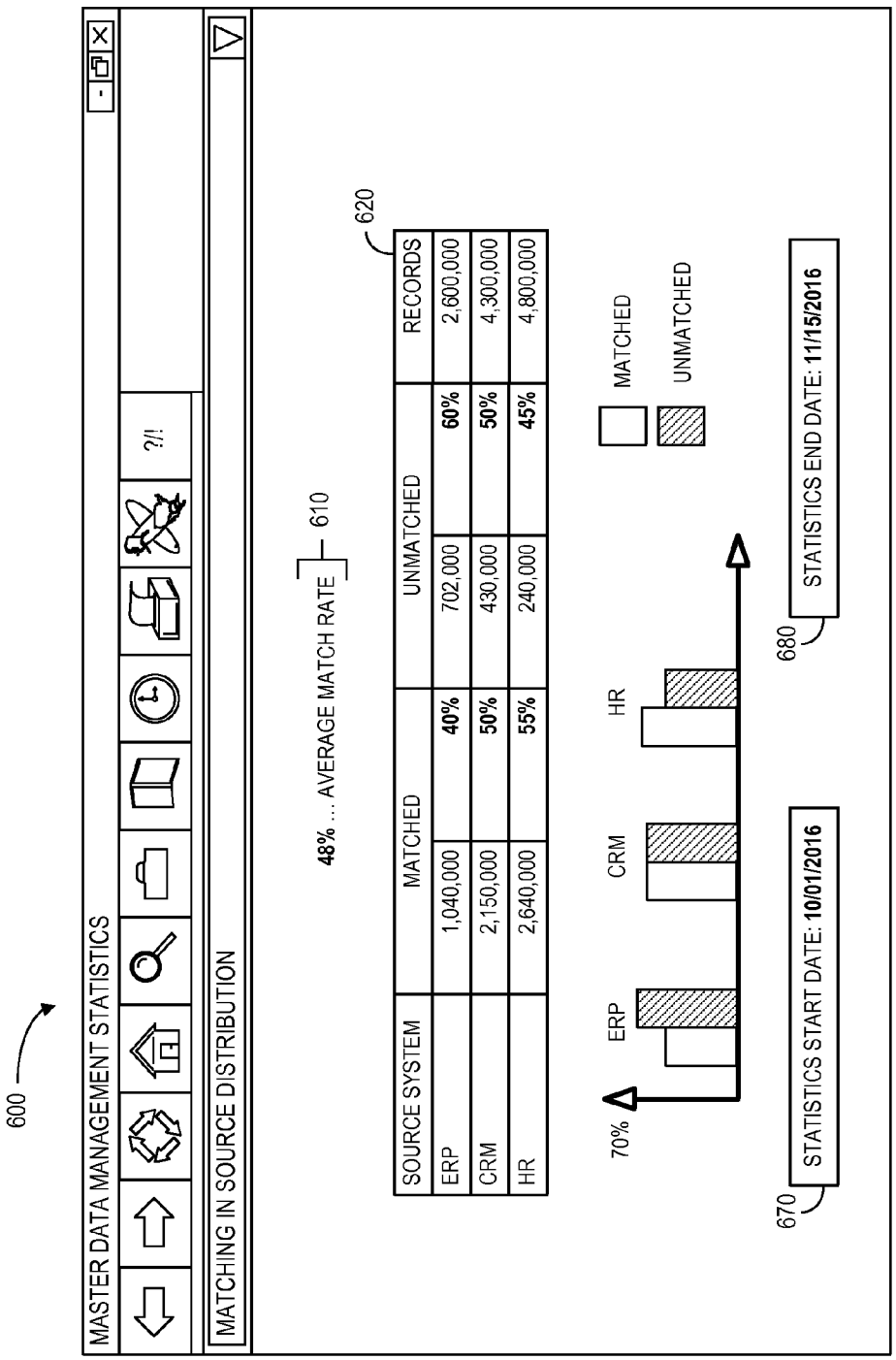
FIG. 6 illustrates a matching display that may be provided according to some embodiments.

FIG. 6 illustrates a matching display 600 that may be provided according to some embodiments. The matching display 600 may provide an overall average match rate 610 across all systems as well as a table 620 breaking down match rates on a system-by-system basis. The display 600 may further indicate a statistics start date 670 and a statistics end date 680 (and a data steward may define or adjust those dates as desired). That is, the 55% of the records from an HR system were matched with other records from the HR system between Oct. 1, 2016 and Nov. 15, 2016 (and if either the statistics start or end date 670, 680 is changed, that percentage would be re-calculated as appropriate). In this way, a data steward may help others understand the scope of records being matched by a master data management program over various periods of time (and perhaps help a program director see how successful the program has been).

Figure 7:
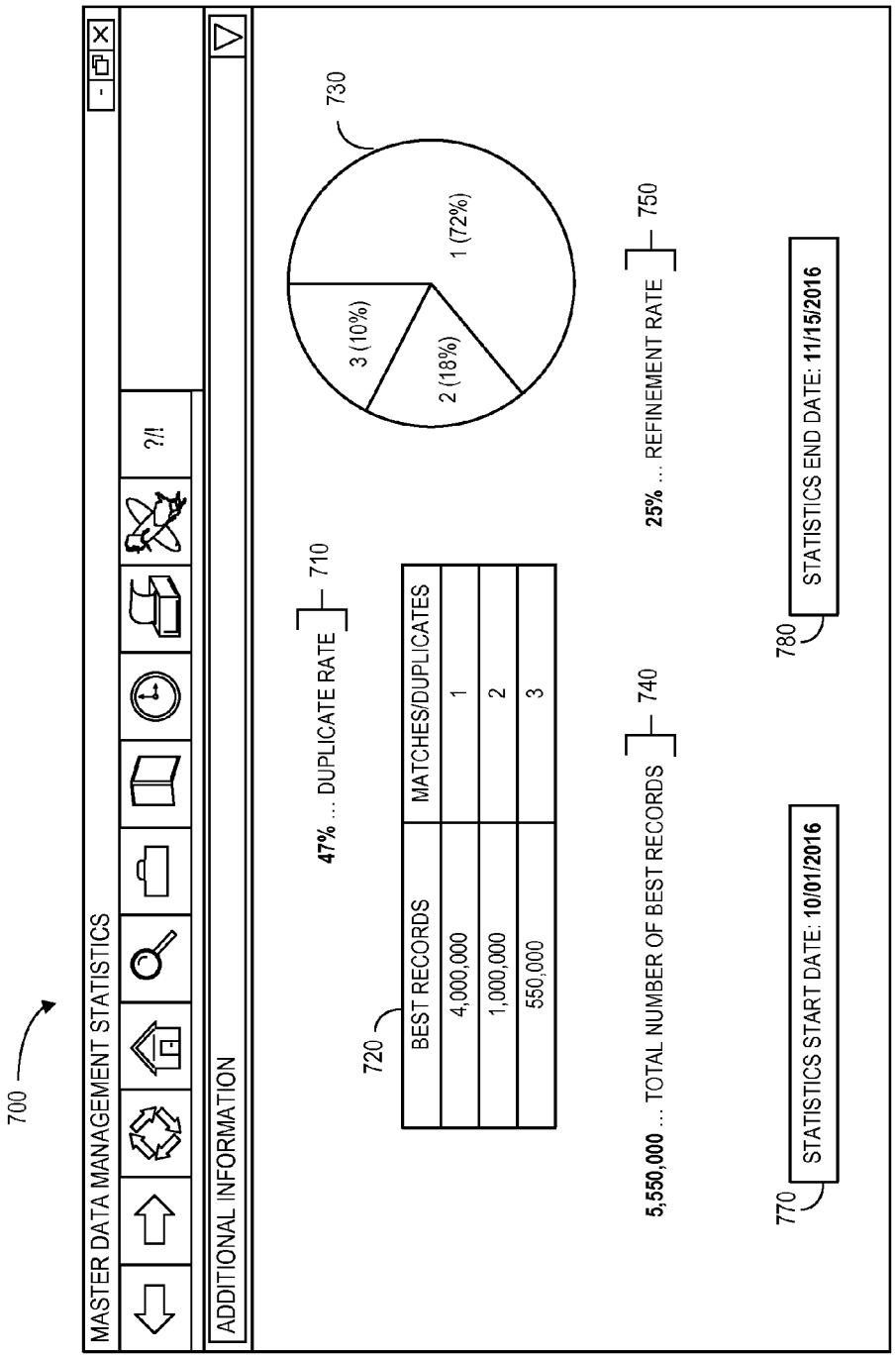
FIG. 7 illustrates an additional information display that may be provided in accordance with some embodiments.

FIG. 7 illustrates an additional information display 700 that may be provided in accordance with some embodiments. The additional information display 700 may indicate an average duplicate record rate 710 and a table 720 and graph 730 showing the numbers of record duplications that have been used to a create master or "best" records. The display 700 may also indicate an overall number of best records 740 and a rate at which records are being improved via a refinement process 750. The additional information display 700 may further indicate a statistics start date 770 and a statistics end date 780 (and a data steward may define or adjust those dates as desired). That is, a total number of 5,550,000 best records were created between Oct. 1, 2016 and Nov. 15, 2016 (and if either the statistics start or end date 770, 780 is changed, that number of recorded would be re-calculated as appropriate). In this way, a data steward may help others understand the scope of master or best records being created by the master data management program over various periods of time (which might lead to additional staffing for the program).

Figure 8:
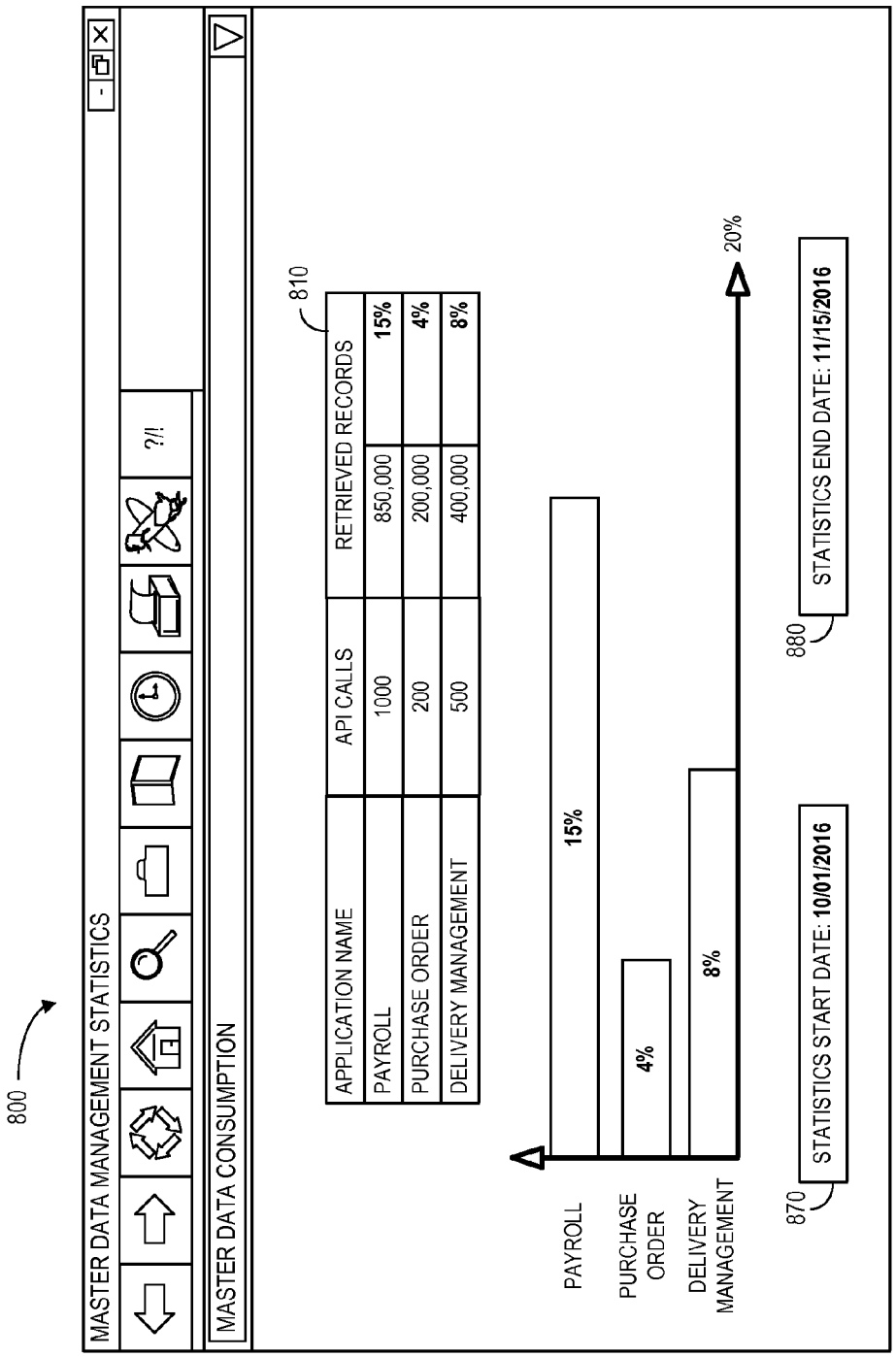
FIG. 8 illustrates a consumption display that may be provided according to some embodiments.

FIG. 8 illustrates a consumption display 800 that may be provided according to some embodiments. The consumption display 800 may include, for example, a table 810 indicating how many records have been retrieved via Application Programming Interface ("API") calls by other applications within the enterprise (or perhaps external to the enterprise). The consumption display 800 may further indicate a statistics start date 870 and a statistics end date 880 (and a data steward may define or adjust those dates as desired). That is, 850,000 records were retrieved as a result of API calls made by a payroll application between Oct. 1, 2016 and Nov. 15, 2016 (and if either the statistics start or end date 870, 880 is changed, that number of recorded would be re-calculated as appropriate). In this way, a data steward may help others understand the scope of how master or best records are being used over various periods of time (which might lead other portions of the enterprise to increase support or funding of the master data management program).

Figure 9:
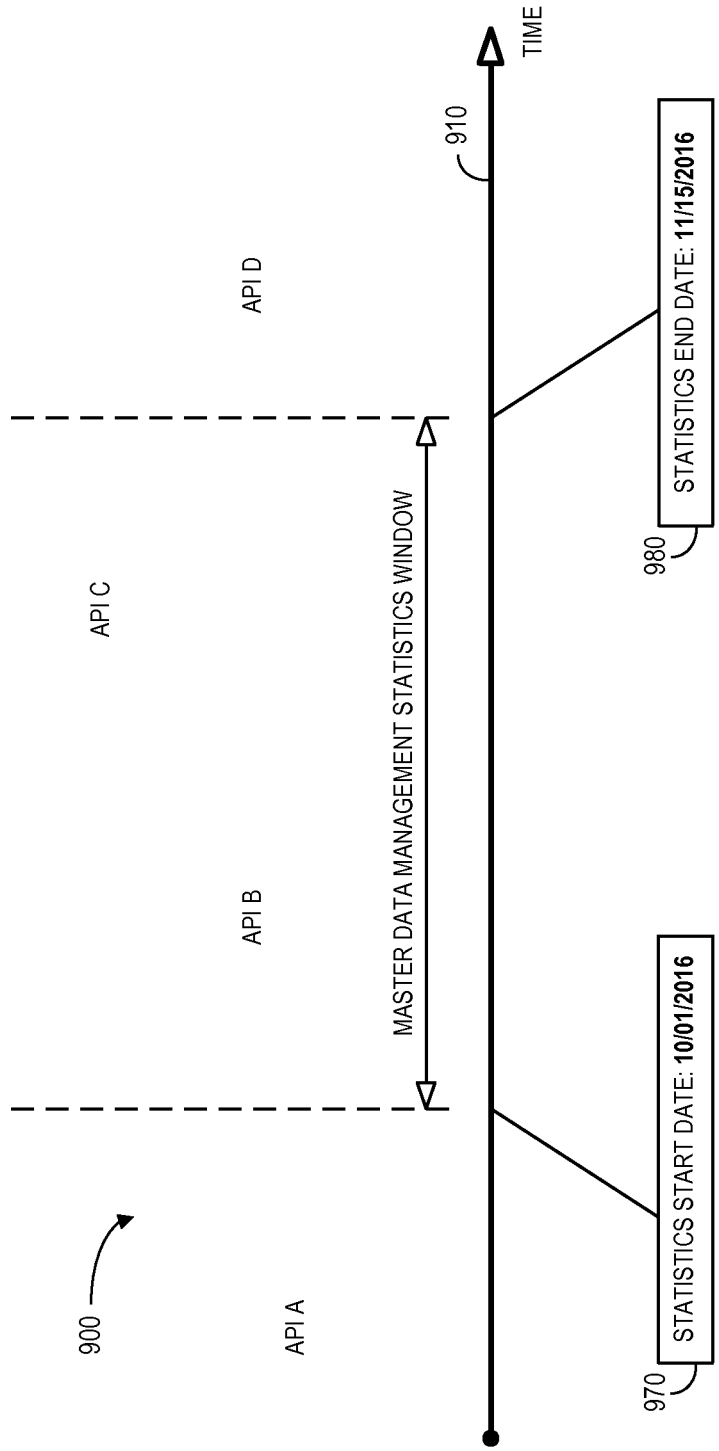
FIG. 9 is an example of a master data management timeline in accordance with some embodiments.

FIG. 9 is an example 900 of a master data management timeline 910 in accordance with some embodiments. In particular, API call A was made prior to a statistics start date 970, and API call D was made after a statistics end date 980. In contrast, API calls B and C were made between the statistics start date 970 and statistics end date 980 (and thus occurred within or during the "window" defined by those dates). As a result, records retrieved as a result of API calls B and C may be used to calculate and display master data management statistics (but no records retrieved as a result of API calls A or D).

Figure 10:
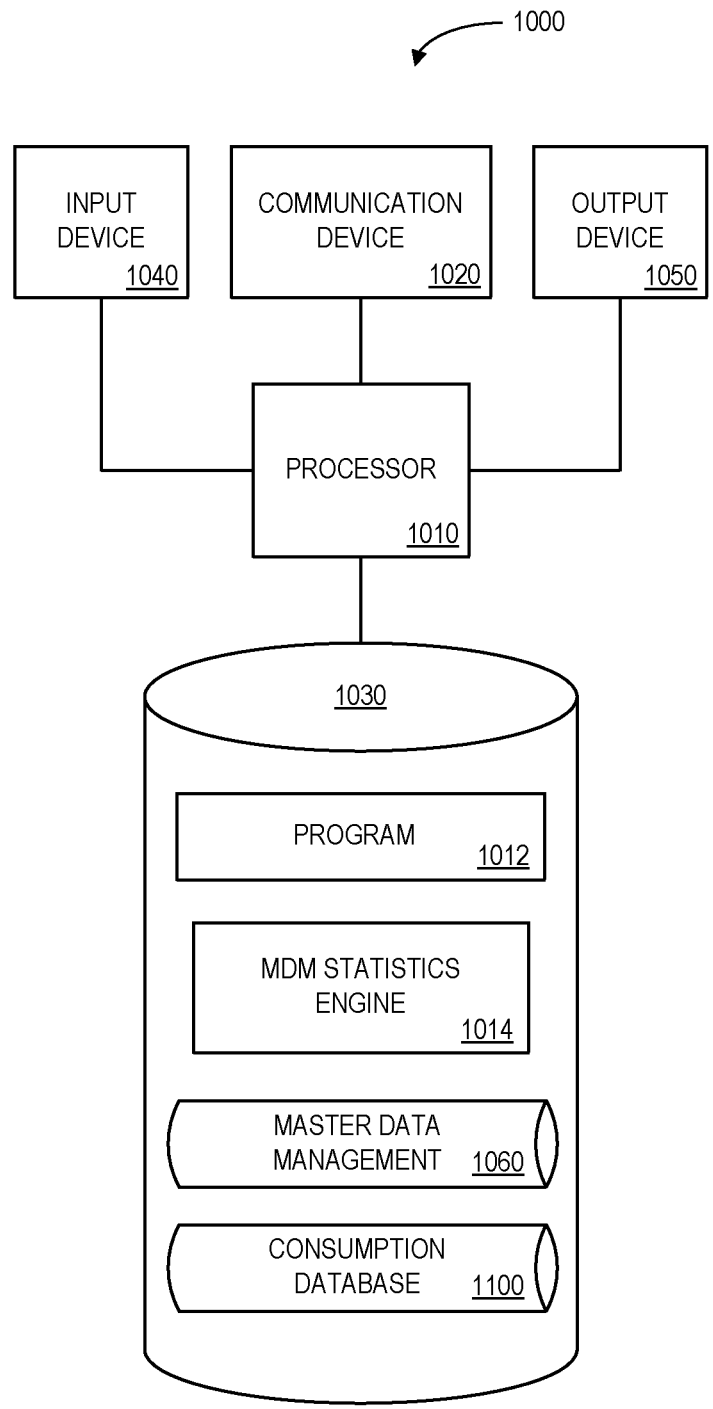
FIG. 10 is a block diagram of a master data management apparatus that might be provided according to some embodiments.

FIG. 10 is a block diagram overview of a master data management apparatus 1000 according to some embodiments. The master data management apparatus 1000 may be, for example, associated with any of the devices described herein. The master data management apparatus 1000 comprises a processor 1010, such as one or more commercially available Central Processing Units (CPUs) in the form of one-chip microprocessors, coupled to a communication device 1020 configured to communicate via a communication network (not shown in FIG. 10). The communication device 1020 may be used to communicate, for example, with one or more remote data sources, master databases, and/or data stewards. The master data management apparatus engine 1000 further includes an input device 1040 (e.g., a mouse and/or keyboard to enter statistics start or end dates) and an output device 1050 (e.g., a computer monitor to display a user interface element and/or master data reports).

The processor 1010 communicates with a storage device 1030. The storage device 1030 may comprise any appropriate information storage device, including combinations of magnetic storage devices (e.g., a hard disk drive), optical storage devices, and/or semiconductor memory devices. The storage device 1030 stores a program 1012 and/or master data management statistics engine application 1014 for controlling the processor 1010. The processor 1010 performs instructions of the programs 1012, 1014, and thereby operates in accordance with any of the embodiments described herein. For example, the processor 1010 may receive a plurality of records over a period of time from a plurality of sources. As the records are received during the period of time, master data management may be performed by the processor 1010 to match at least some records from different sources with each other. A statistics window within the period of time may be determined by the processor 1010, and at least one master data management statistics value may be calculated by the processor based on the master data management that was performed during the statistics window. The calculated master data management statistics value may then be displayed by the processor 1010.

The programs 1012, 1014 may be stored in a compressed, uncompiled and/or encrypted format. The programs 1012,

1014 may furthermore include other program elements, such as an operating system, a database management system, and/or device drivers used by the processor 1010 to interface with peripheral devices.

As used herein, information may be "received" by or "transmitted" to, for example: (i) the master data management apparatus 1000 from another device; or (ii) a software application or module within the master data management apparatus 1000 from another software application, module, or any other source.

Figure 11:
FIG. 11 is an example of a tabular portion of an input record database according to some embodiments.

In some embodiments (such as shown in FIG. 10), the storage device 1030 stores master data management information and a consumption database 1100 (described with respect to FIG. 11). One example of a consumption database 1100 that may be used in connection with the master data management apparatus 1000 will now be described in detail with respect to FIG. 11. Note that the databases described herein are examples, and additional and/or different information may be stored therein. Moreover, various databases might be split or combined in accordance with any of the embodiments described herein.

Referring to FIG. 11, a table is shown that represents the consumption database 1100 that may be stored at the master data management apparatus 1000 according to some embodiments. The table may include, for example, entries identifying records that have been consumed by other applications. The table may also define fields 1102, 1104, 1106, 1108 for each of the entries. The fields 1102, 1104, 1106, 1108 may, according to some embodiments, specify: a consumption identifier 1102, an application 1104, a date 1106, and a number of records retrieved 1108. The information in the consumption database 1100 may be automatically created and updated, for example, based on actions performed by other applications.

The consumption identifier 1102 may be, for example, an alphanumeric code associated with a particular use of information in a master data database. The application 1104 may be the name of the program or platform that requested the data and the date 1106 may indicate when the request for data was made or executed. The number of retrieved records 1108 may indicate how many records were provided to the application 1104 as a result of the request. The date 1106 and number of retrieved records 1108 may be used, for example, to demonstrate how useful a master data program is to various entities within an enterprise (that is, the entities associated with the applications 1104).

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
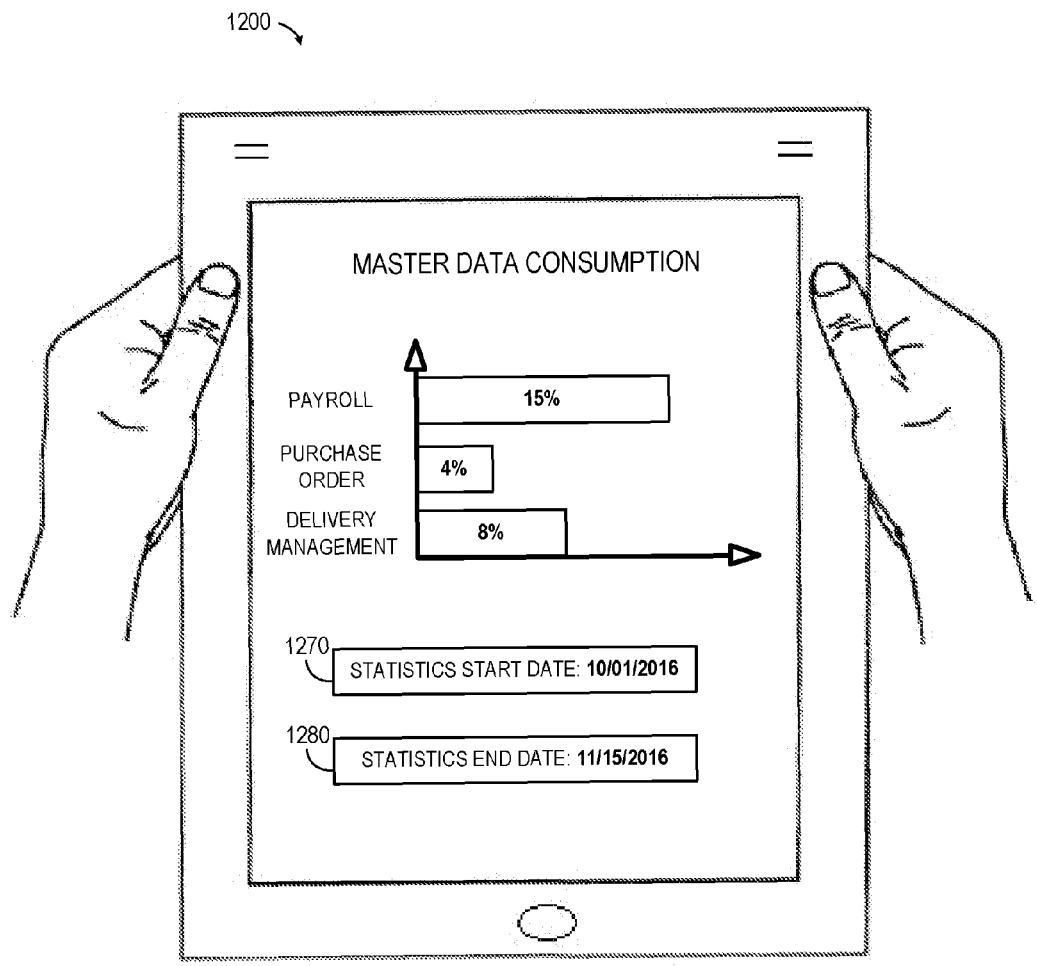
FIG. 12 illustrates a mobile device providing master data management information in accordance with some embodiments.

Although embodiments have been described with respect to particular types of data, note that embodiments may be associated with other types of information. For example, financial information and/or health data records may be processed in accordance with any of the embodiments described herein. Similarly, while some embodiments have been described with respect to web-type browser displays, FIG. 12 illustrates master data consumption being displayed on a handheld device 1200, such as a laptop, a tablet computer, or a smartphone, including a statistics start and end date 1270, 1280.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method, comprising:
receiving, over a period of time, a plurality of records from a plurality of sources;
as the records are received during the period of time, matching at least some records from different sources with each other to create a best record of the at least some records;
determining, by computer processor of a master data management statistics platform, a statistics window within the period of time;
calculating at least one master data management statistics value based on the master data management that was performed during the statistics window; and
displaying a dashboard display associated with the calculated master data management statistics value, the dashboard display including a consume information area indicating a number of best records retrieved by other applications.

2. The method of claim 1, wherein the calculated master data management statistics value is associated with records being retrieved by a plurality of applications.

3. The method of claim 2, wherein records retrieved by a plurality of applications is via calls by an application programming interface.

4. The method of claim 1, wherein the calculated master data management statistics value is associated with at least one of: (i) source based record distribution, (ii) region based record distribution, (iii) record cleansing data, (iv) record matching data, (vi) record duplication data, (vii) best record calculations, and (viii) a refinement rate.

5. The method of claim 1, wherein the dashboard display further includes an aggregate information area, a cleanse information area, a match information area, a consume information area, a statistics start date and a statistics end date.

6. The method of claim 1, wherein the statistics window is associated with a statistics start date and a statistics end date and the calculated master data management statistics value is not based on master data management that was performed before the statistics start date or after the statistics end date.

7. The method of claim 6, wherein the statistics start date and the statistics end date are defined by a data steward.

8. The method of claim 7, wherein the calculated master data management statistics value is displayed to the data steward both as a numerical value and as a graphical representation.

9. A non-transitory, computer-readable medium storing program code executable by a computer to:
receive, over a period of time, a plurality of records from a plurality of sources;
as the records are received during the period of time, matching at least some records from different sources with each other to create a best record of the at least some records;
determine, by a computer processor of a master data management statistics platform, a statistics window during the period of time;
calculate at least one master data management statistics value based on the master data management that was performed within the statistics window; and display a dashboard display associated with the calculated master data management statistics value, the dashboard display including a consume information area indicating a number of best records retrieved by other applications.

10. The medium of claim 9, wherein the calculated master data management statistics value is associated with records being retrieved by a plurality of applications.

11. The medium of claim 10, wherein records retrieved by a plurality of applications is via calls by an application programming interface.

12. The medium of claim 9, wherein the calculated master data management statistics value is associated with at least one of: (i) source based record distribution, (ii) region based record distribution, (iii) record cleansing data, (iv) record matching data, (vi) record duplication data, (vii) best record calculations, and (viii) a refinement rate.

13. The medium of claim 9, wherein the dashboard display further includes an aggregate information area, a cleanse information area, a match information area, a consume information area, a statistics start date and a statistics end date.

14. The medium of claim 13, wherein the statistics window is associated with a statistics start date and a statistics end date and the calculated master data management statistics value is not based on master data management that was performed before the statistics start date or after the statistics end date.

15. The medium of claim 14, wherein the calculated master data management statistics value is displayed to the data steward both as a numerical value and as a graphical representation.

16. A system, comprising:
a plurality of input data stores to provide, over a period of time, a plurality of records associated with different sources;
a master record data store;
a master data server, coupled to the input data stores and the master record data store, to (i) receive the records from the input data stores and (ii) store master records into the master record data store the master records comprising one or more best records associated with the input data stores; and
a master data management platform, wherein the master data management platform is to:
determine a statistics window within the period of time,
calculate at least one master data management statistics value based on the master data management that was performed during the statistics window, and
display a dashboard display associated with the calculated master data management statistics value, the dashboard display including a consume information area indicating a number of best records retrieved by other applications.

17. The system of claim 16, wherein the calculated master data management statistics value is associated with records being retrieved by a plurality of applications.

18. The system of claim 17, wherein the records retrieved by a plurality of applications is via calls by an application programming interface.

19. The system of claim 16, wherein the calculated master data management statistics value is associated with at least one of: (i) source based record distribution, (ii) region based record distribution, (iii) record cleansing data, (iv) record matching data, (vi) record duplication data, (vii) best record calculations, and (viii) a refinement rate.

20. The system of claim 16, wherein the dashboard display further includes an aggregate information area, a cleanse information area, a match information area, a consume information area, a statistics start date and a statistics end date.

21. The medium of claim 20, wherein the statistics window is associated with a statistics start date and a statistics end date defined by a data steward and the calculated master data management statistics value is displayed to the data steward both as a numerical value and as a graphical representation.

* * * * *